United States Patent
Cho et al.

(10) Patent No.: US 7,492,430 B2
(45) Date of Patent: Feb. 17, 2009

(54) IN-PLANE SWITCHING MODE LIQUID CRYSTAL DISPLAY DEVICE AND METHOD OF MANUFACTURING THE SAME

(75) Inventors: Heung Lyul Cho, Gyeonggi-do (KR); Soon Sung Yoo, Gunpo-si (KR)

(73) Assignee: LG Display Co., Ltd., Seoul (KR)

( * ) Notice: Subject to any disclaimer, the term of this patent is extended or adjusted under 35 U.S.C. 154(b) by 424 days.

(21) Appl. No.: 11/474,498

(22) Filed: Jun. 26, 2006

(65) Prior Publication Data
US 2006/0290868 A1  Dec. 28, 2006

(30) Foreign Application Priority Data
Jun. 27, 2005  (KR) ...................... 10-2005-0055725

(51) Int. Cl.
*G02F 1/1343* (2006.01)
*G02F 1/13* (2006.01)
(52) U.S. Cl. ...................... 349/141; 349/142; 349/143; 349/187
(58) Field of Classification Search ................. 349/141, 349/139, 140, 142, 143, 144, 147, 187
See application file for complete search history.

(56) References Cited

U.S. PATENT DOCUMENTS

| 5,010,027 | A  | * | 4/1991  | Possin et al. | ................. | 438/159 |
|---|---|---|---|---|---|---|
| 5,130,263 | A  | * | 7/1992  | Possin et al. | ................. | 438/159 |
| 6,005,648 | A  | * | 12/1999 | Zhang et al.  | .................. | 349/43  |
| 6,607,935 | B2 | * | 8/2003  | Kwon          | ........................... | 438/56  |
| 6,740,596 | B2 | * | 5/2004  | Hayase et al. | ................ | 438/706 |
| 2002/0044248 | A1 |   | 4/2002  | Park et al.   | .................... | 349/141 |
| 2006/0290868 | A1 | * | 12/2006 | Cho et al.    | ................... | 349/141 |
| 2007/0002250 | A1 | * | 1/2007  | Yoo et al.    | .................... | 349/141 |

FOREIGN PATENT DOCUMENTS

KR     2004-25472     3/2004

* cited by examiner

*Primary Examiner*—Brian M Healy
(74) *Attorney, Agent, or Firm*—McKenna Long & Aldridge LLP

(57) ABSTRACT

A method of manufacturing an IPS switching mode liquid crystal display device includes forming a first insulation layer on a substrate, forming an electrode layer on the substrate containing the first insulation layer, forming a second insulation layer on the electrode layer, etching the second insulation layer such that the second insulation layer remains on sides of the first insulation layer, and etching the electrode layer using the remaining second insulation layer as a mask to form a plurality of electrodes. The plurality of electrodes are formed to have widths of about 0.1 μm to 2 μm, thus aperture ratio and transmittance are increased.

19 Claims, 8 Drawing Sheets

IN-PLANE SWITCHING MODE LIQUID CRYSTAL DISPLAY DEVICE AND METHOD OF MANUFACTURING THE SAME

This application claims the benefit of Korean Patent Application No. P2005-55725, filed on Jun. 27, 2005, which is hereby incorporated by reference as if fully set forth herein.

BACKGROUND OF THE INVENTION

1. Field of the Invention

The present invention relates to a liquid crystal display device, and more particularly, to an IPS mode liquid crystal display device.

2. Discussion of the Related Art

From among very thin flat panel display devices having screens with a thickness of only a few centimeters, a liquid crystal display device is mainly used in wide variety of fields such as a laptop computer, a monitor, and aircraft.

The liquid crystal display includes a lower substrate, an upper substrate, and a liquid crystal layer formed between the upper and lower substrates. In the liquid crystal display device, when voltage is applied, an arrangement of the liquid crystal is changed and transmittance of light based upon the rearranged liquid crystals is adjusted to display images.

Hereinafter, a related art liquid crystal display device will be described in detail with reference to the accompanying drawings.

Figure 1A:
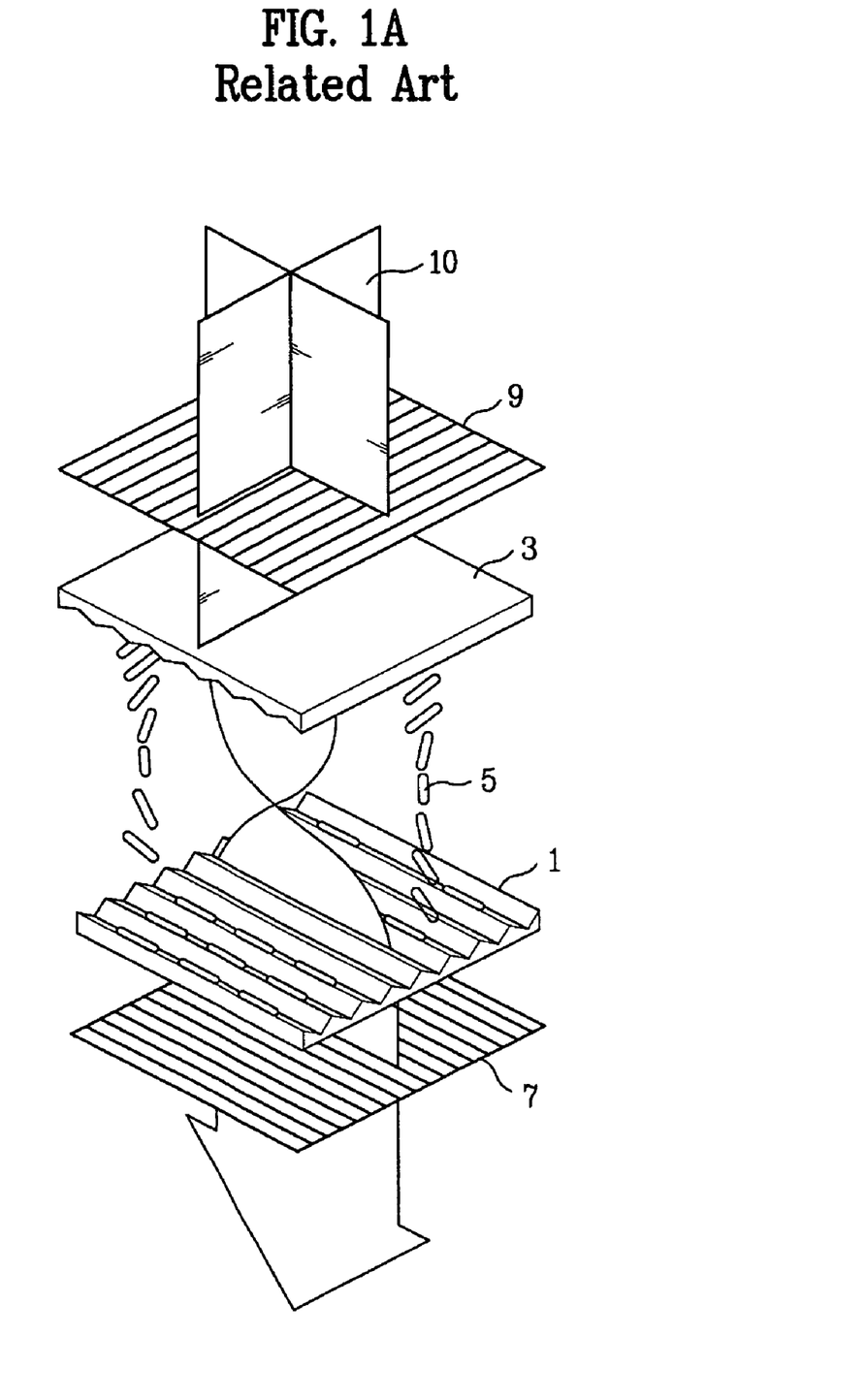
FIGS. 1A and 1B are schematic views respectively illustrating a related art twisted nematic mode liquid crystal display device to which voltage is applied and the related art twisted nematic mode liquid crystal display device to which voltage is not applied.
Figure 1B:
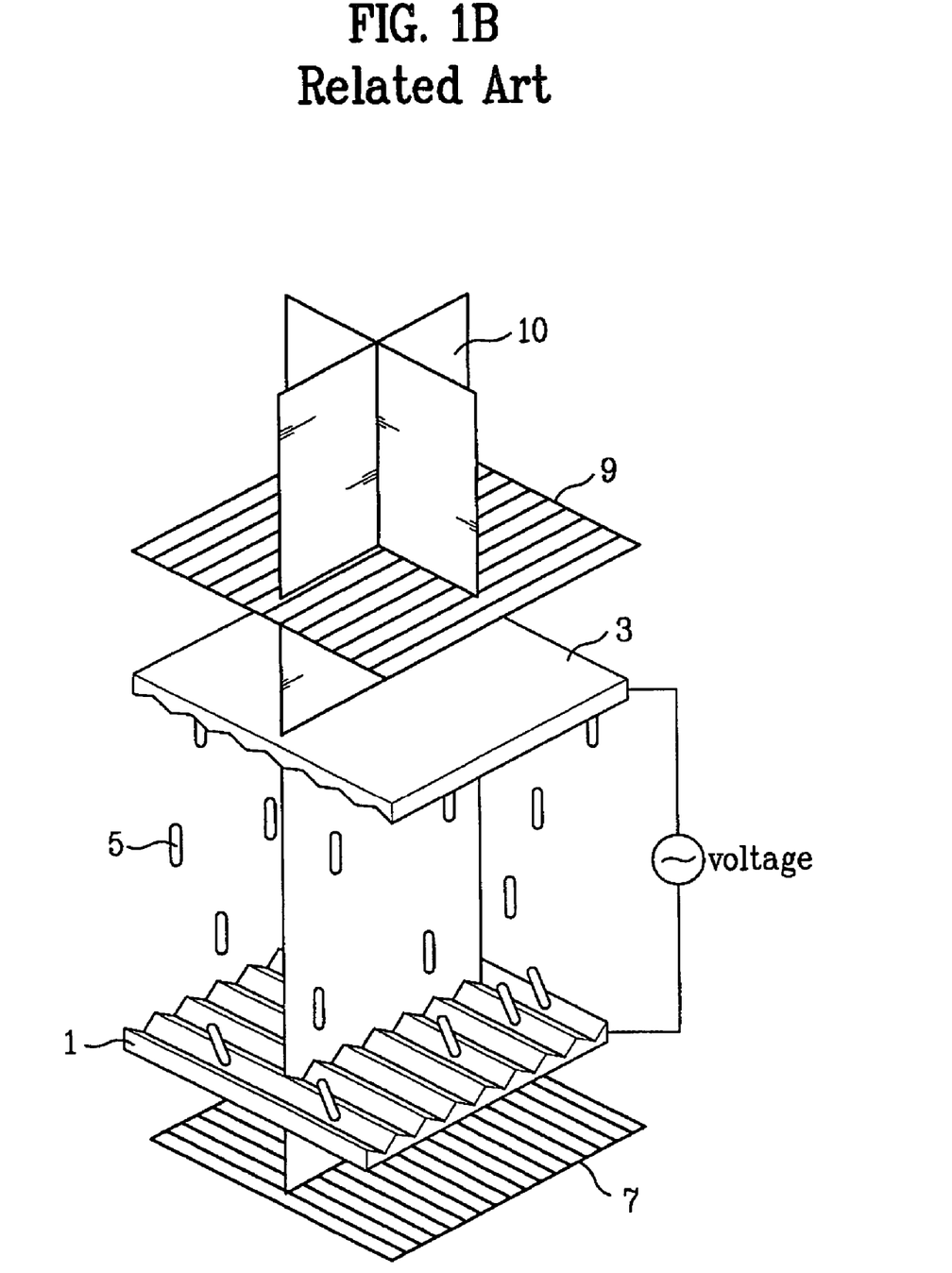

FIG. 1 is a schematic perspective view illustrating a related art liquid crystal display device, in particular, a twisted nematic (TN) mode liquid crystal display device. FIG. 1A illustrates a state of the related art TN mode liquid crystal display device to which voltage is not applied, and FIG. 1B illustrates a state of the related art TN mode liquid crystal display device to which voltage is applied.

First, the structure of the related art TN mode liquid crystal display device will be described briefly and the operation principle thereof will be described in detail.

The Related Art TN mode liquid crystal display device includes a first substrate 1, a second substrate 3, and a liquid crystal layer 5 formed between the first and second substrates 1 and 3.

The first substrate 1 includes a first polarizing plate 7 formed on the outer side thereof and having a transmission axis oriented to a predetermined direction, and the second substrate 3 includes a second polarizing plate 9 formed on the outer side of the second substrate 3 and having a transmission axis opposite to that of the first polarizing plate 7.

Moreover, although not depicted in the drawings, the first substrate 1 includes a pixel electrode and the second substrate 3 includes a common electrode so that a vertical directional electric field is generated between the pixel electrode and the common electrode.

As shown in FIG. 1A, when voltage is not applied, the liquid crystal layer 5 is twisted by 90 degrees between the first substrate 1 and the second substrate 3. Here, when light 10 enters through the second polarizing plate 9, the light 10 passes through the liquid crystal layer 5. At this time, like molecules of the liquid crystal layer twisted by 90 degrees, the light 10 is twisted by 90 degrees and passes through the first polarizing plate 7. Thus, a white image is displayed.

As shown in FIG. 1B, when voltage is applied, the molecules of the liquid crystal layer 5 are vertically arranged between the substrates 1 and 3 by the vertical direction electric field between the pixel electrode and the common electrode. Here, when the light 10 enters through the second polarizing plate 9, the light 10 passes through the liquid crystal layer 5. At this time, since the polarizing direction of the light does not rotate, the light 10 cannot pass through the first polarizing plate 7. Thus, a black image is displayed.

However, the TN mode liquid crystal display device has a critical shortcoming of having a narrow viewing angle.

Figure 2A:
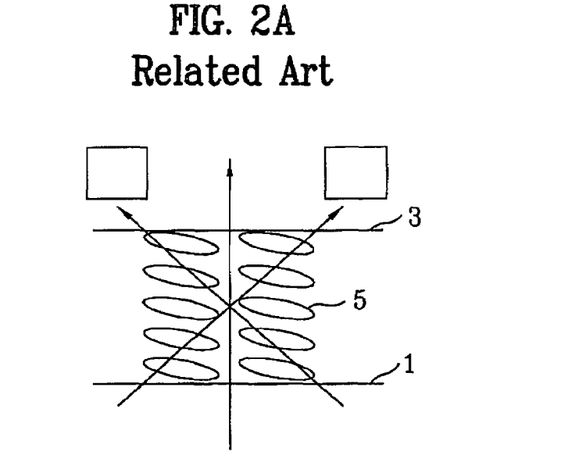
FIG. 2A illustrates a white display state in which voltage is not applied.
Figure 2B:
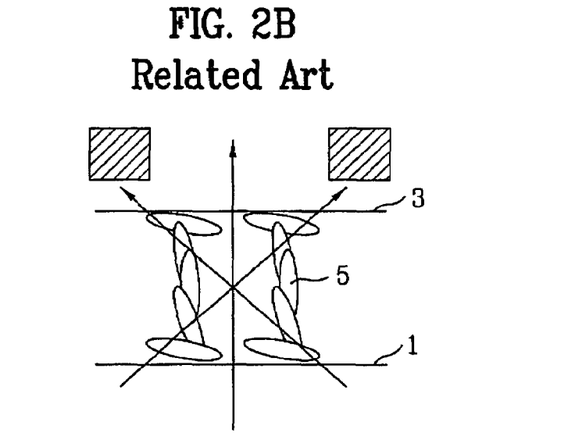
FIG. 2B illustrates a black display state in which voltage is applied.

FIGS. 2A and 2B are views illustrating the problem of the viewing angle of the related art TN mode liquid crystal display device.

FIG. 2A illustrates the white displaying state in which voltage is not applied, FIG. 2B illustrates the black displaying state in which full voltage is applied, and FIG. 2B illustrates the intermediate displaying state in which intermediate voltage is applied.

As shown in FIG. 2A, when voltage is not applied, the molecules of the liquid crystal layer 5 are twisted by a minute angle in the same direction and the incident light (depicted by arrows in the drawing) is displayed as white light in all directions.

As shown in FIG. 2B, when the full voltage is applied, the molecules of the liquid crystal layer 5 are arranged in the vertical direction due to the effect of the electric field and the incident light is not twisted and therefore black is displayed.

Figure 2C:
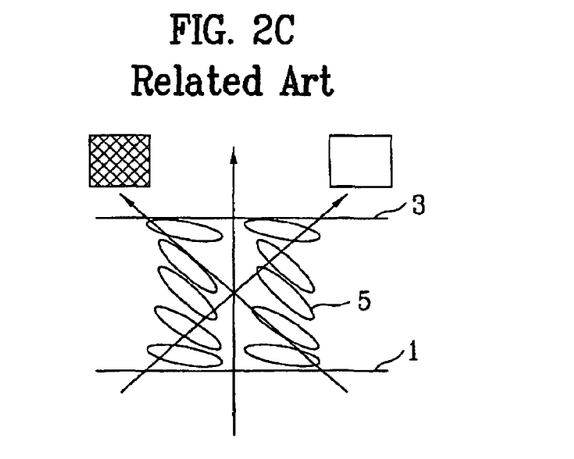
FIG. 2C illustrates an intermediate displaying state in which an intermediate voltage is applied.

As shown in FIG. 2C, when the intermediate voltage is applied, the molecules of the liquid crystal layer 5 are arranged in the slant direction and the displayed states are different according to the directions of the incident light. In other words, a light entered in the direction from right lower side to the left upper side displays black because the polarizing direction of the light is not changed, and on the contrary, a light entered in the direction from the left lower side to the right upper side is displayed as white because the polarizing direction of the light is twisted.

As such, the related TN mode liquid crystal display device has the shortcoming such that a displaying state is different based upon the incident angle of the light and the viewing angle is narrow.

Research for widening the viewing angle is being carried out with vigor and various approaches are proposed. For example, there are proposed an in-plane switching (IPS) mode using a horizontal directional electric field, an vertical alignment (VA) mode using a vertical arranged layer, and an electrically controlled birefringence (ECB) mode, a multi-domain method of dividing a domain and using a mean value of the arrangement of the molecules of the liquid crystal layer, and a phase compensation method of using a phase difference film to change phase difference according to the change of the viewing angle.

The present invention relates to an IPS mode liquid crystal display device among the methods of widening a viewing angle, and hereinafter the related art IPS mode liquid crystal display device will be described in detail.

Figure 3A:
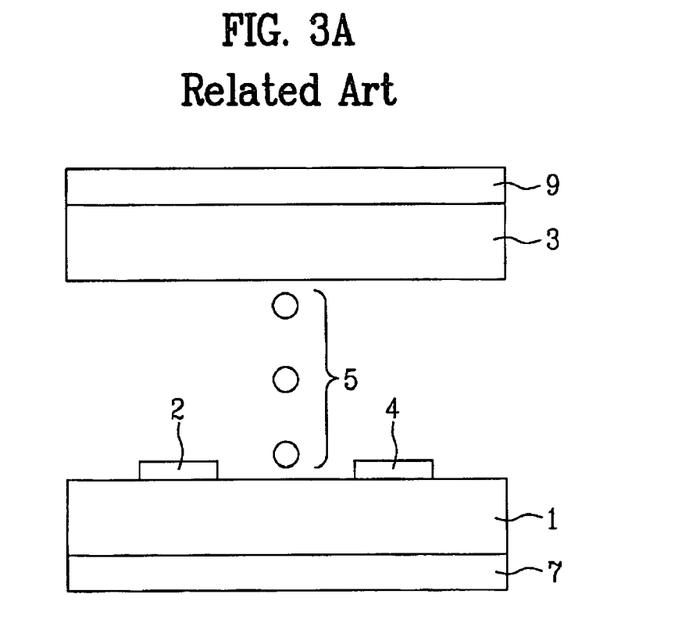
FIG. 3A is a sectional view and FIG. 3B is a plan view illustrating the related art IPS mode liquid crystal display device to which voltage is not applied.
Figure 3B:
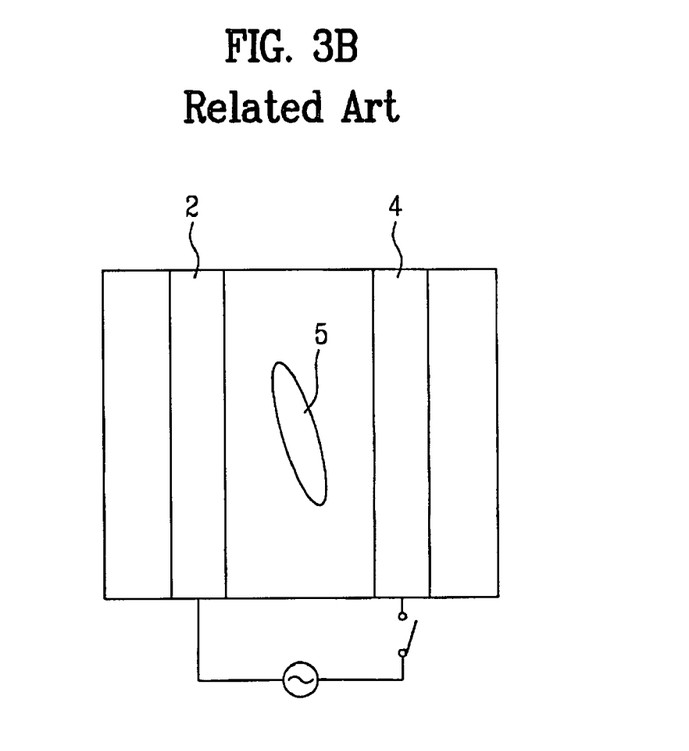
Figure 3C:
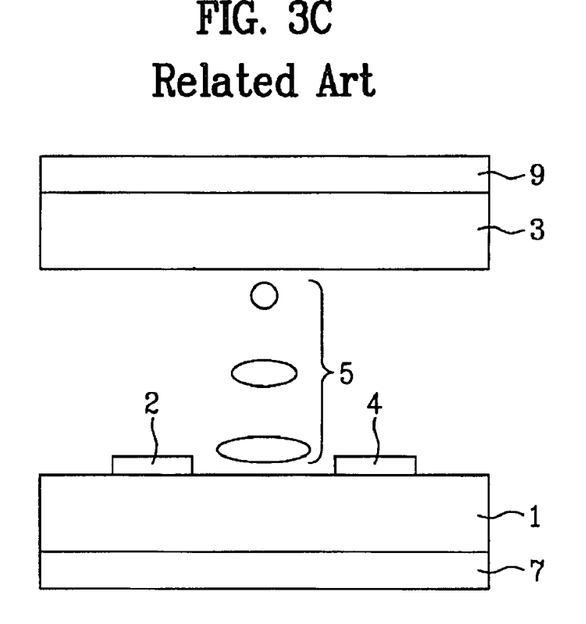
FIGS. 3C and 3D are a sectional view and a plan view, respectively, illustrating the related art IPS mode liquid crystal display device to which voltage is applied.
Figure 3D:
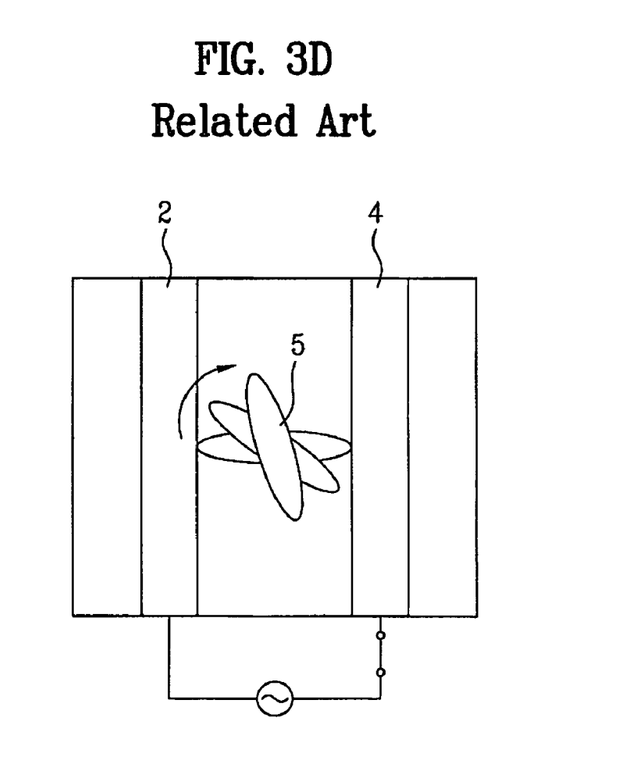

FIGS. 3A-3D illustrate the related art IPS mode liquid crystal display device, wherein FIGS. 3a and 3b are a sectional view and a plan view, respectively, illustrating the related art IPS mode liquid crystal display device to which voltage is not applied, and FIGS. 3c and 3d are a sectional view and a plan view, respectively, illustrating the related art IPS mode liquid crystal display device to which voltage is applied.

First, the structure of the related art IPS mode liquid crystal display device will be briefly described and the operation principle thereof will be described in detail.

The related art IPS mode liquid crystal display device includes a first substrate 1, a second substrate 3, and a liquid crystal layer 5 formed between the first and second substrates 1 and 3.

The first substrate 1 includes a first polarizing plate 7 formed on the outer side thereof and having a transmission axis oriented to a predetermined direction, and the second substrate 3 includes a second polarizing plate 9 formed on the outer side of the second substrate 3 and having a transmission axis opposite to that of the first polarizing plate 7.

Moreover, the first substrate 1 includes a pixel electrode 2 and a common electrode 4 parallel to each other such that a horizontal directional electric field is generated between the pixel electrode 2 and the common electrode 4.

As shown in FIGS. 3A and 3B, when voltage is not applied, the liquid crystal layer 5 is arranged between the first substrate 1 and the second substrate 3 approximately parallel to the longitudinal direction of the electrodes 2 and 4. Here, when light 10 enters through the first polarizing plate 7, the light 10 transmits to the liquid crystal layer 5. At this time, since the polarizing direction of the light 10 does not rotate, the light 10 cannot pass through the second polarizing plate 9 having the transmission axis opposite to the transmission axis of the first polarizing plate 7. Thus, a black image is displayed.

As shown in FIGS. 3C and 3D, when voltage is applied, the liquid crystal layer 5 is arranged differently in the vicinity between the first substrate 1 and in the vicinity of the second substrate 3. In other words, the liquid crystal layer 5 is arranged in the vicinity of the first substrate 1 in the vertical direction with respect to a longitudinal direction of the electrodes 2 and 4 due to the horizontal directional electric field between the pixel electrode 2 and the common electrode 4, and is arranged in the vicinity of the second substrate 3 in the horizontal direction with respect to the longitudinal direction of the electrodes 2 and 4, like the case when the voltage is not applied because the effect of the electric field is weak.

Thus, when the light 10 enters through the first polarizing plate 7, the light 10 then passes through the liquid crystal layer 5. At this time, since, like the molecules of the liquid crystal layer 5, the light 10 is twisted and passed through, the light 10 passes through the second polarizing plate 9 opposite to the first polarizing plate 7. Thus, a white image is displayed.

As such, since, in the related IPS mode liquid crystal display device, the molecules of the liquid crystal layer are erected vertically but switched horizontally, the viewing angle is not changed according to the incident angle of the light even when the intermediate voltage is applied.

However, since the pixel electrode 2 and the common electrode 4 are formed on the first substrate 1, the related IPS mode liquid crystal display device has a low transmittance.

The reason of the low transmittance is because the aperture ratio is decreased as much as the widths of the pixel electrode 2 and the common electrode 4. At the present time, the widths of the pixel electrode 2 and the common electrode 4 is about 4 μm, which is a minimum width capable of being formed by photolithography. When the photolithography is carried out, there is a limit to reduction in the widths of the pixel electrode 2 and the common electrode 4 due to the characteristics of photolithography.

SUMMARY OF THE INVENTION

Accordingly, present invention is directed to an in-plane switching mode LCD and a method of manufacturing an in-plane switching mode liquid crystal display device that substantially obviate one or more problems due to limitations and disadvantages of the related art.

An advantage of the present invention is to provide a method of manufacturing an in-plane switching mode liquid crystal display device in which a new process is used such that widths of a pixel electrode and a common electrode are remarkably reduced to increase an aperture ratio.

Another advantage of the present invention is to provide an in-plane switching mode liquid crystal display device in which widths of a pixel electrode and a common electrode are remarkably reduced to increase an aperture ratio.

Additional features and advantages of the invention will be set forth in part in the description which follows and in part will be apparent from the description or may be learned by practice of the invention. These and other advantages of the invention will be realized and attained by the structure particularly pointed out in the written description and claims hereof as well as the appended drawings.

To achieve these objects and other advantages and in accordance with the purpose of the invention, as embodied and broadly described herein, a method of manufacturing an in-plane switching mode liquid crystal display device includes forming a first insulation layer with a predetermined shape on a substrate, forming an electrode layer on the substrate containing the first insulation layer, forming a second insulation layer on the electrode layer, etching the second insulation layer such that the second insulation layer remains on sides of the first insulation layer, and etching the electrode layer using the remaining second insulation layer as a mask to form a plurality of electrodes.

In another aspect of the present invention, a in-plane switching mode liquid crystal display device includes a first substrate and a second substrate facing each other and respectively having pixel regions, a liquid crystal layer between the first and second substrates, a first insulation layer patterned on the first substrate, and common electrodes and pixel electrodes alternately formed on sides of the first insulation layer, wherein the common and pixel electrodes are arranged substantially parallel to each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings:

FIGS. 2A-2C are views illustrating a problem of a narrow viewing angle in the related art twisted nematic mode liquid crystal display device, wherein

FIGS. 3A-3D are views illustrating a related art IPS mode liquid crystal display device, wherein

DETAILED DESCRIPTION OF THE ILLUSTRATED EMBODIMENTS

Figure 4A:
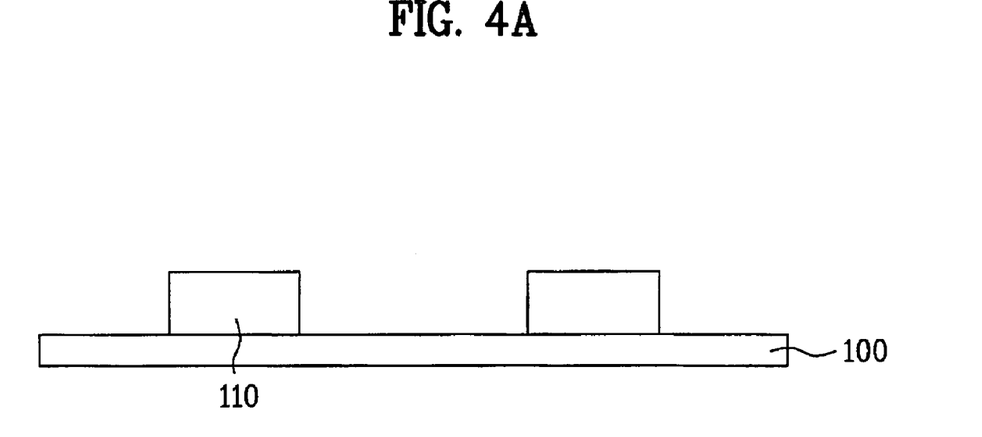
FIGS. 4A to 4E are sectional views illustrating a manufacturing process of an IPS mode liquid crystal display device according to an embodiment of the present invention.
Figure 4B:
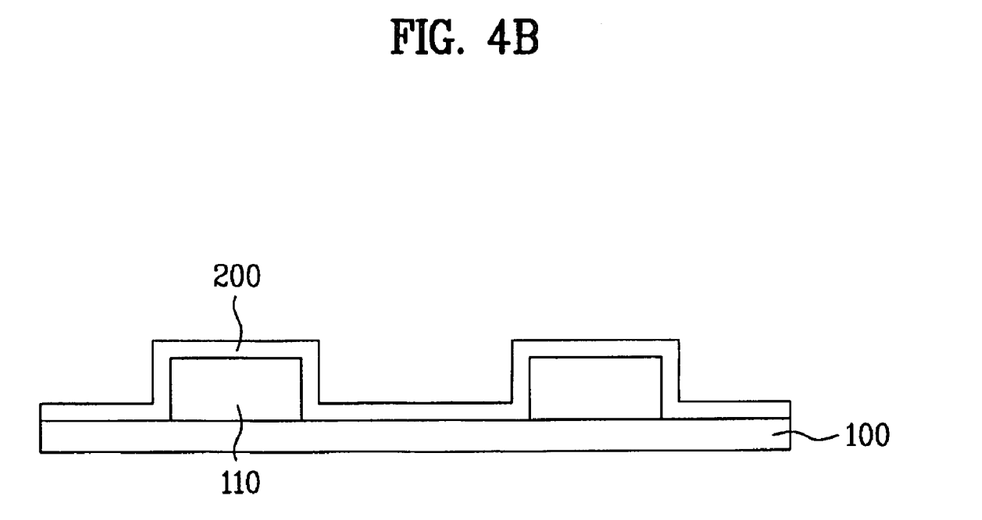
Figure 4C:
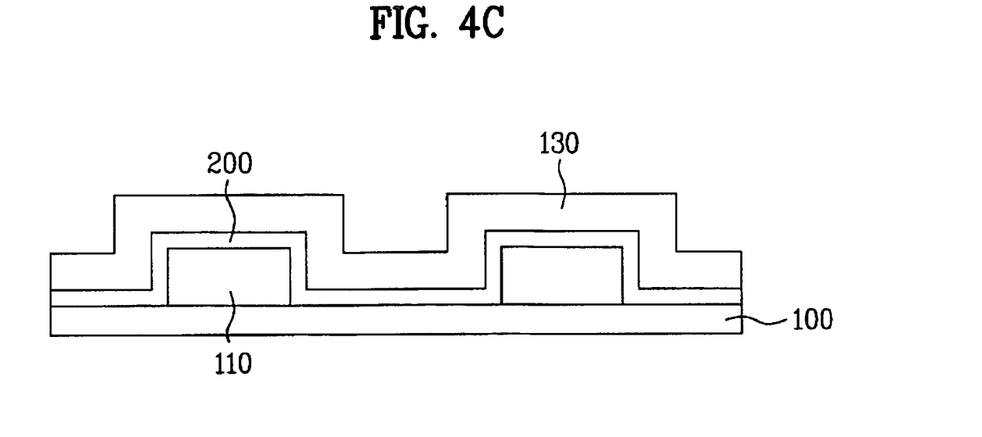
Figure 4D:
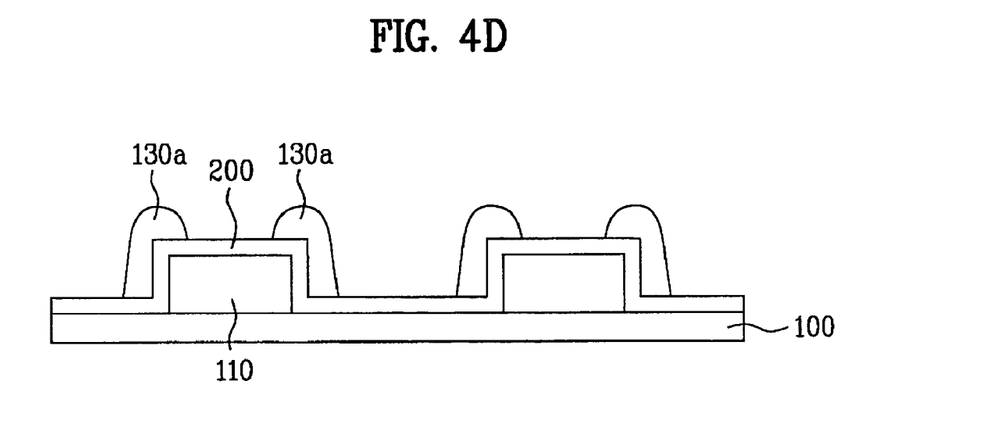
Figure 4E:
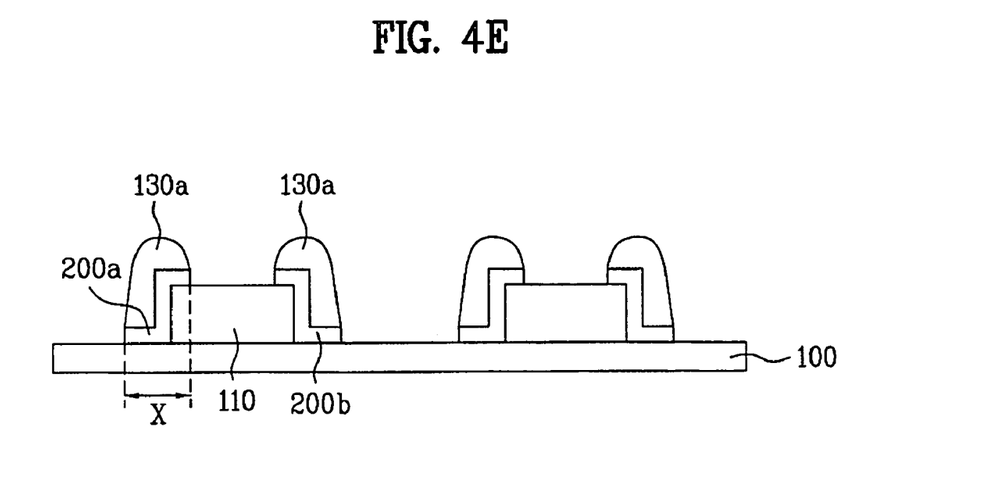
Figure 5:
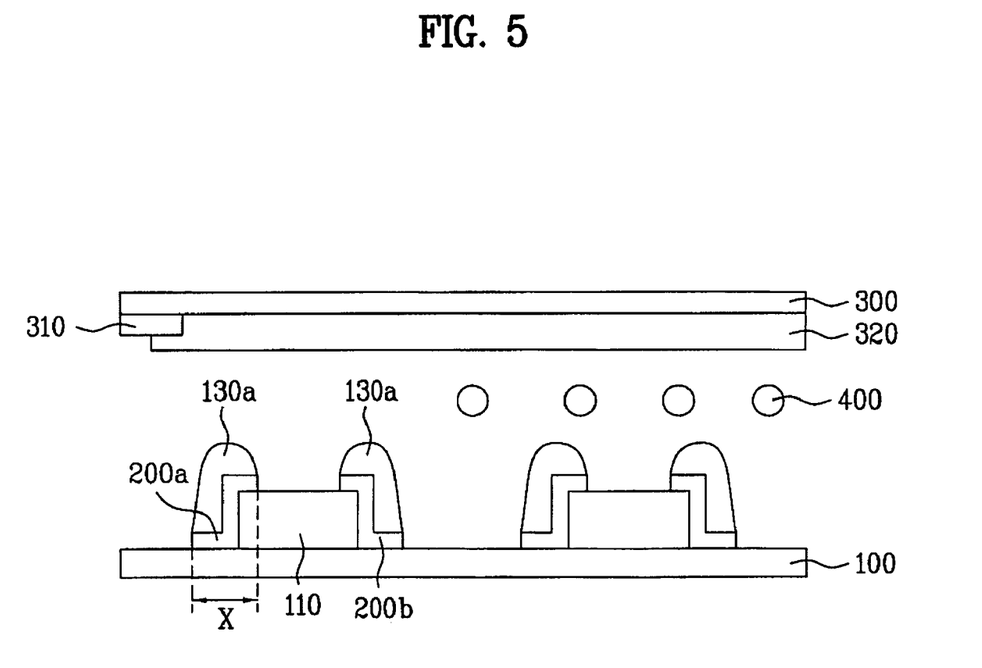
FIG. 5 is a sectional view illustrating an IPS mode liquid crystal display device according to an embodiment of the present invention.

Reference will now be made in detail to embodiments of the present invention, examples of which are illustrated in FIGS. 4A to 5.

FIGS. 4A to 4B are sectional views illustrating a manufacturing process of an in-plane switching mode liquid crystal display device according to an embodiment of the present invention. FIGS. 4A to 4E illustrate only the process of forming a pixel electrode and a common electrode within a unit pixel region of the in-plane switching mode liquid crystal display device. Other elements may be applied by various methods known in the art of the present invention and modifications thereof.

As shown in FIG. 4A, a first insulation layer 110 is patterned to have a predetermined shape on a substrate 100.

The first insulation layer 110 may be made of inorganic material such as SiOx, SiNx, and the like, organic material such as benzocyclobutene, polyvinyl alcohol, and the like, or a dual layer of an inorganic material and an organic material.

After that, as shown in FIG. 4B, an electrode layer 200 for a common electrode and a pixel electrode is formed on the entire surface of the substrate 100 containing the first insulation layer 110.

A transparent metal such as ITO or an opaque metal such as Mo, Ti, and the like may be the material for the electrode layer 200.

After that, as shown in FIG. 4C, a second insulation layer 130 is formed on the electrode layer 200.

The second insulation layer 130 may be formed with a proper material suitable to implement a predetermined shape using etching during a process described later. An inorganic material is preferable, for example, $SiO_2$ or SiOx may be used.

After that, as shown in FIG. 4D, the second insulation layer 130 is etched such that second insulation layers 130a are formed at the sides of the first insulation layer 110.

Preferably, the etching may be performed by dry etching using etching gas.

While using an inorganic material such as $SiO_2$ or SiNx as the second insulation layer 130, when the etching gas is injected, as shown in FIG. 4D, the second insulation layers 130a remains only at the sides of the first insulation layer 110. It is understood that the result is generated because a thickness of the second insulation layer 130 is relatively thicker at the sides of the first insulation layer 110 than at other regions.

After that, as shown in FIG. 4E, the electrode layer 200 is etched using a remaining second insulation layers 130a as masks so that a common electrode 200a and a pixel electrode 200b are formed to be substantially parallel to each other.

The common electrode 200a and the pixel electrode 200b contact the sides of the first insulation layers 110, and horizontally extend to the upper side of the first insulation layer 110 and the surface of the substrate 100. Also, the common electrode 200a and the pixel electrode are arranged substantially in parallel.

Although not depicted in the drawings, after the process in FIG. 4E, the remaining second insulation layers 130a can be removed.

As such, the widths (See a length X depicted in FIG. 4E) of the common electrode 200a and the pixel electrode 200b are determined as summation of the thickness of the electrode layer 200 formed during the process in FIG. 4B and the length extended to the upper side of the first insulation layer 110 and the surface of the substrate 100. Since a thickness of the electrode layer 200 can be formed within a range of about 0.03 μm to about 0.1 μm, when taking the extended length into consideration, the widths X of the common electrode 200a and the pixel electrode 200b can be formed within a range of about 0.1 μm to about 2 μm and as such an aperture ratio is remarkably increased.

As described above, FIGS. 4A to 4E illustrate the process of forming the pixel electrode and the common electrode within unit pixel regions. Gate lines and data lines crossing each other are formed in the unit pixel regions, and thin film transistors are formed in the crossing regions of the gate lines and the data lines.

The gate lines, the data lines, and the thin film transistors may be formed by various methods known in the art of the present invention.

Moreover, FIGS. 4A to 4E illustrate a process of forming the substrate on which the pixel electrode and the common electrode are formed. The in-plane switching mode liquid crystal display device is formed by disposing the liquid crystal layer between the substrate and an opposite substrate facing the substrate and bonding the substrate and the opposite substrate together.

At this time, the opposite substrate is manufactured by sequentially forming a light shielding layer, a red color filter layer, a blue color filter layer, and a green color filter layer.

Moreover, one of the substrates may be further formed with a spacer to maintain a cell gap of the liquid crystal display device.

At least one of the substrates may be further formed with an orientation film for the purpose of an initial orientation of the liquid crystal. The orientation film may be formed by a rubbing alignment using a compound of polyamide or polyimide, polyvinyl alcohol (PVA), polyamic acid, and the like, or by a photo-alignment using a photo-reactive material such as a polyvinyl cinnamate (PVCN) compound, a polysiloxane cinnamate PSCN) compound, a cellulose cinnamate (CelCL) compound, and the like.

A vacuum injection method and a dropping method may be used to provide the liquid crystal layer between the substrates.

The vacuum injection method is a method of bonding the substrates and injecting liquid crystal through an injection port; while the dropping method is a method of dropping the liquid crystal on any one of the substrates and bonding the substrates. If the substrates are big in size, because it takes a long time to inject the liquid crystal by the vacuum injection method and the productivity is deteriorated, the dropping method is a suitable method.

FIG. 5 is a sectional view illustrating an IPS mode liquid crystal display device according to an embodiment of the present invention, and illustrates a pixel electrode and a common electrode within the unit pixel regions of the IPS mode liquid crystal display device.

As shown in FIG. 5, the IPS mode liquid crystal display device according to an embodiment of the present invention includes the first substrate 100 and the second substrate 300 facing each other, and the liquid crystal layer 400 formed between the substrates 100 and 300.

On the first substrate 100, the first insulation layer 110 is patterned, and the common electrodes 200a and the pixel electrodes 200b are alternately formed on the sides of the first insulation layer 110.

The common electrodes 200a and the pixel electrodes 200b contact the sides of the first insulation layer 110, and horizontally extend to the upper sides of the first insulation layer 110 and the surface of the substrate 100. Also, the common electrodes 200a and the pixel electrodes are arranged substantially in parallel to generate a horizontal directional electric field.

Moreover, second insulation layers 130a may be formed on the common electrodes 200a and the pixel electrodes 200b.

Here, a transparent metal such as ITO or an opaque metal such as Mo, Ti, and the like may be material for the common electrodes 200a and the pixel electrodes 200b. Moreover, widths X of the common electrodes 200a and the pixel electrodes 200b are from about 0.1 µm to about 2 µm.

The first insulation layer may be formed with an inorganic material or an organic material.

The second insulation layer may be preferably formed with an inorganic material, for example, $SiO_2$ or SiNx.

On the second substrate 300, a light shielding layer 310 for preventing light from leaking, and an RGB (red, green, and blue) color filter layer 320 are formed on the light shielding layer 310.

Although not depicted in the drawings, on the first substrate 100, gate lines and data lines cross each other to define pixel regions, and thin film transistors are formed in the crossing regions of the gate lines and the data lines.

The substrates 100 and 300 are sealed by a sealing material, and a spacer may be formed between the substrates 100 and 200 to maintain a cell gap of the liquid crystal display device. The spacer may be a ball-shaped spacer or a column-shaped spacer.

Moreover, at least one of the substrates 100 and 300 may be further formed with an orientation film for the purpose of an initial orientation of the liquid crystal.

Although not described in detail, various elements other than the common electrodes 200a and the pixel electrodes 200b as core of the present invention may be modified by various methods known in the art of the present invention.

According to the present invention, because the common electrodes and the pixel electrodes can be formed with a width from about 0.1 µm to about 2 µm, the aperture ratio is remarkably increased and transmittance is also increased.

When researching a method of remarkably reducing widths of the pixel electrode and the common electrode for the purpose of increasing an aperture ratio in the in-plane switching mode liquid crystal display device, the inventors have invented the present invention from the phenomenon that when the process is controlled to remain the electrode layer on the sides of the patterned insulation layer, the width of the remaining electrode layer becomes very small. The inventors have applied the electrode layer remaining on the sides of the insulation layer to the common electrode and the pixel electrode.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing an in-plane switching mode liquid crystal display device comprising:
    forming a first insulation layer having a predetermined shape on a substrate;
    forming an electrode layer on the substrate containing the first insulation layer;
    forming a second insulation layer on the electrode layer;
    etching the second insulation layer such that the second insulation layer remains on sides of the first insulation layer; and
    etching the electrode layer using the remaining second insulation layer as a mask to form a plurality of electrodes.

2. The method of claim 1, wherein the plurality of electrodes includes common and pixel electrodes arranged substantially parallel to each other.

3. The method of manufacturing an in-plane switching mode liquid crystal display device as set forth in claim 1, wherein the etching of the second insulation layer is performed by dry etching using an etching gas.

4. The method of manufacturing an in-plane switching mode liquid crystal display device as set forth in claim 1, wherein the second insulation layer is $SiO_2$ or SiNx.

5. The method of manufacturing an in-plane switching mode liquid crystal display device as set forth in claim 1, further comprising removing the remaining second insulation layer.

6. The method of manufacturing an in-plane switching mode liquid crystal display device as set forth in claim 1, further comprising:
    forming gate lines and data lines crossing each other on the substrate; and
    forming thin film transistors at the crossings of the gate lines and the data lines.

7. The method of manufacturing an in-plane switching mode liquid crystal display device as set forth in claim 6, further comprising:
    preparing an opposite substrate facing the substrate, the opposite substrate having a light shielding layer and a color filer layer; and
    forming a liquid crystal layer between the substrate and the opposite substrate.

8. The method of manufacturing an in-plane switching mode liquid crystal display device as set forth in claim 7, wherein forming the liquid crystal layer comprises:
    dropping the liquid crystal layer on at least one of the substrate and the opposite substrate; and
    bonding the substrate and the opposite substrate together.

9. A in-plane switching mode liquid crystal display device, comprising:
    a first substrate and a second substrate facing each other and respectively having pixel regions;
    a liquid crystal layer between the first and second substrates;
    a first insulation layer patterned on the first substrate; and
    common electrodes and pixel electrodes alternately formed on sides of the first insulation layer wherein the common and pixel electrodes are arranged substantially parallel to each other.

10. The in-plane switching mode liquid crystal display device as set forth in claim 9, further comprising second insulation layers on the common electrodes and the pixel electrodes.

11. The in-plane switching mode liquid crystal display device as set forth in claim 9, wherein widths of the common electrodes and the pixel electrodes are from about 0.1 µm to about 2 µm.

12. The in-plane switching mode liquid crystal display device as set forth in claim 9, wherein the common electrodes and the pixel electrodes are a transparent metal or an opaque metal.

13. The in-plane switching mode liquid crystal display device as set forth in claim 9, wherein the first insulation layer is an inorganic material or an organic material.

14. The in-plane switching mode liquid crystal display device as set forth in claim 9, wherein the second insulation layers are an inorganic material.

15. The in-plane switching mode liquid crystal display device as set forth in claim 14, wherein the second insulation layers are $SiO_2$ or SiNx.

16. The in-plane switching mode liquid crystal display device as set forth in claim 9, wherein the common electrodes and the pixel electrodes contact sides of the first insulation layer and extend to an upper side of the first insulation layer and a surface of the first substrate.

17. The in-plane switching mode liquid crystal display device as set forth in claim 9, further comprising:
   gate lines and data lines formed on the first substrate to cross each other; and
   thin film transistors formed at the crossings of the gate lines and the data lines.

18. The in-plane switching mode liquid crystal display device as set forth in claim 9, further comprising a light shielding layer and a color filter layer on the second substrate.

19. The in-plane switching mode liquid crystal display device as set forth in claim 9, further comprising a spacer between the first substrate and the second substrate to maintain a cell gap.

* * * * *